United States Patent
Sato et al.

(10) Patent No.: US 10,661,367 B2
(45) Date of Patent: May 26, 2020

(54) GEAR MACHINING METHOD AND GEAR MACHINING DEVICE

(71) Applicant: JTEKT CORPORATION, Osaka-shi (JP)

(72) Inventors: Minoru Sato, Okazaki (JP); Hideaki Uno, Nagoya (JP)

(73) Assignee: JTEKT CORPORATION, Osaka-shi (JP)

(*) Notice: Subject to any disclaimer, the term of this patent is extended or adjusted under 35 U.S.C. 154(b) by 15 days.

(21) Appl. No.: 15/996,650

(22) Filed: Jun. 4, 2018

(65) Prior Publication Data

US 2018/0354047 A1 Dec. 13, 2018

(30) Foreign Application Priority Data

Jun. 7, 2017 (JP) ................................. 2017-112275

(51) Int. Cl.
| | |
|---|---|
| B23F 17/00 | (2006.01) |
| B23F 9/08 | (2006.01) |
| B23Q 1/62 | (2006.01) |
| B23F 19/10 | (2006.01) |
| B23F 21/16 | (2006.01) |
| B23F 5/16 | (2006.01) |

(52) U.S. Cl.
CPC ............ B23F 19/104 (2013.01); B23F 21/16 (2013.01); B23F 5/163 (2013.01)

(58) Field of Classification Search
CPC ........ B23F 19/104; B23F 21/16; B23F 5/163; B23F 1/06; B23F 5/20
See application file for complete search history.

(56) References Cited

U.S. PATENT DOCUMENTS

| | | | |
|---|---|---|---|
| 2009/0060672 A1* | 3/2009 | Fitzgerald | B23C 3/12 409/31 |
| 2012/0099939 A1* | 4/2012 | Stadtfeld | B23F 15/06 409/38 |
| 2013/0047390 A1* | 2/2013 | Ongaro | B23Q 39/026 29/27 C |
| 2013/0266391 A1* | 10/2013 | Schweiker | B23F 5/163 409/51 |
| 2015/0328704 A1* | 11/2015 | Otani | B23F 5/20 409/33 |
| 2016/0158860 A1* | 6/2016 | Prock | B23F 5/163 409/37 |
| 2017/0252843 A1* | 9/2017 | Matsubara | B23F 21/12 |

FOREIGN PATENT DOCUMENTS

| | | |
|---|---|---|
| JP | 57-107735 | 7/1982 |
| JP | 2000-210817 | 8/2000 |
| JP | 2014-172112 | 9/2014 |

* cited by examiner

*Primary Examiner* — Nicole N Ramos
(74) *Attorney, Agent, or Firm* — Oblon, McClelland, Maier & Neustadt, L.L.P.

(57) ABSTRACT

A gear machining method includes: roughing a workpiece while causing a cylindrical hob cutter to rotate in synchronization with a rotation of the workpiece such that a cutting allowance remains; and finishing by cutting off the cutting allowance remaining on the workpiece on which the roughing has been performed during the roughing to form a desired gear shape by feeding a skiving cutter relatively to the workpiece in the rotation axis direction of the workpiece while causing the skiving cutter to rotate in synchronization with the rotation of the workpiece.

6 Claims, 6 Drawing Sheets

GEAR MACHINING METHOD AND GEAR MACHINING DEVICE

INCORPORATION BY REFERENCE

The disclosure of Japanese Patent Application No. 2017-112275 filed on Jun. 7, 2017 including the specification, drawings and abstract, is incorporated herein by reference in its entirety.

BACKGROUND OF THE INVENTION

1. Field of the Invention

The present invention relates to a gear machining method and a gear machining device.

2. Description of Related Art

A gear machining method using a hob cutter or a skiving cutter is known. As for a gear machining method using a hob cutter, for example, Japanese Patent Application Publication No. 2000-210817 (JP 2000-210817 A) discloses a gear machining method in which roughing with a roughing gear hob is performed, and then finishing with a finishing gear hob is performed. Japanese Patent Publication No. 57-107735 (JP 57-107735 A) discloses an external-gear machining method using an hourglass gear hob and an internal-gear machining method using a barrel gear hob. Japanese Patent Application Publication No. 2014-172112 (JP 2014-172112 A) discloses a gear machining method using a skiving cutter.

In the technique described in JP 2000-210817 A, when the finishing gear hob is used for finishing with high accuracy, a period of time required for the finishing becomes longer due to a low feed rate of the finishing gear hob. In the technique described in JP 57-107735 A, the complicated shapes of the hourglass gear hob and the barrel gear hob make manufacturing of a tool difficult and accordingly increases the tool cost. In gear machining with the skiving cutter, the depth of cut needs to be set smaller in order to prevent the skiving cutter from wearing in a short period of time. Consequently, a period of time required for the gear machining becomes longer.

SUMMARY OF THE INVENTION

One object of the present invention is to provide a gear machining method and a gear machining device that enable both reduction of machining time and improvement of machining accuracy while suppressing increase of tool costs.

A gear machining method according to one aspect of the present invention includes: roughing a workpiece while causing a cylindrical hob cutter to rotate in synchronization with a rotation of the workpiece such that a cutting allowance remains; and finishing by cutting off the cutting allowance remaining on the workpiece on which the roughing has been performed during the roughing to form a desired gear shape by feeding a skiving cutter relatively to the workpiece in the rotation axis direction of the workpiece while causing the skiving cutter to rotate in synchronization with the rotation of the workpiece W.

A gear machining device according to another aspect of the present invention includes the roughing controller and the finishing controller. The roughing controller controls roughing on a workpiece while causing a cylindrical hob cutter to rotate in synchronization with a rotation of the workpiece such that a cutting allowance remains. The finishing controller controls finishing of cutting the cutting allowance remaining on the workpiece on which the roughing has been performed to form a desired gear shape by feeding a skiving cutter relatively to the workpiece in the rotation axis direction of the workpiece while causing the skiving cutter to rotate in synchronization with the rotation of the workpiece.

In the gear machining method according to the aspect described above, highly accurate machining is not required during the roughing, and thus the feeding speed of the hob cutter can be set high. In the gear machining method of the present invention, finishing with the skiving cutter is performed on the workpiece on which roughing has been performed, whereby a gear to be formed on the workpiece can be formed in a desired shape.

When a cutting allowance in machining of a workpiece W is large, machining with a hob cutter can achieve a larger depth of cut while suppressing wear of a tool than machining with a skiving cutter. When the cutting allowance in machining of the workpiece W is small, machining with the skiving cutter can achieve faster and more accurate machining than machining with the hob cutter. Thus, the gear machining method according to the aspect above enables reduction of time required for gear machining through roughing with the hob cutter and finishing with the skiving cutter.

Furthermore, the gear machining method according to the aspect above can achieve lower tool costs by using the cylindrical hob cutter than when a barrel-shaped hob cutter is used. Thus, the gear machining method of the present invention enables both reduction of machining time and improvement of machining accuracy while suppressing increase of tool costs.

With the gear machining device according to the aspect described above, the roughing controller does not require highly accurate machining during the roughing, and thus the feeding speed of the hob cutter can be set high. The finishing controller performs finishing with the skiving cutter on the workpiece on which roughing has been performed, whereby a gear to be formed on the workpiece can be formed in a desired shape.

When a cutting allowance in machining of a workpiece W is large, machining with the hob cutter can achieve a larger depth of cut while suppressing wear of a tool than machining by the skiving cutter. When the cutting allowance in machining of the workpiece W is small, machining by the skiving cutter can achieve faster and more accurate machining than machining with the hob cutter. Thus, the gear machining device according to the aspect above enables reduction of time required for gear machining through roughing with the hob cutter and finishing with the skiving cutter.

Furthermore, the gear machining device according to the aspect above can achieve lower tool costs by using the cylindrical hob cutter than when a barrel-shaped hob cutter is used. Thus, the gear machining device of the present invention enables both reduction of machining time and improvement of machining accuracy while suppressing increase of tool costs.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Embodiments of the present invention is described below with reference to the attached drawings.

Embodiments according to a gear machining method of the present invention are described below with reference to the drawings. The following describes first an overall structure of a gear machining device 1 used in a gear machining method according to a first embodiment of the present invention with reference to FIG. 1.

Figure 1:
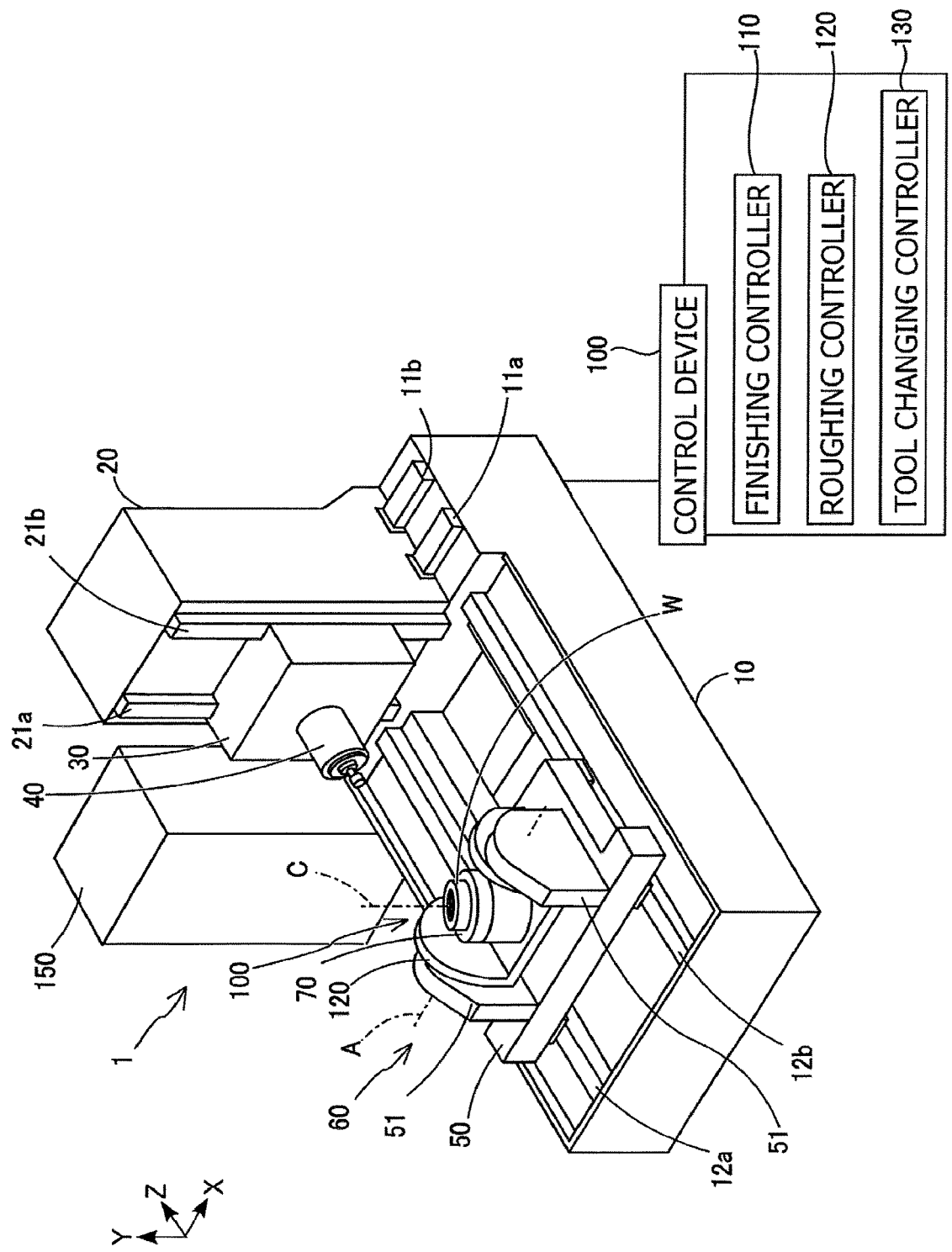
FIG. 1 is a perspective view of a gear machining device according to a first embodiment of the present invention.

As depicted in FIG. 1, the gear machining device 1 is a machining center having three linear axes (X-axis, Y-axis, and Z-axis) orthogonal to each other and two rotational axes (A-axis and C-axis) as drive axes, and performs relative feeding operation between a workpiece W and a tool. The gear machining device 1 may be a horizontal machining center, a vertical machining center, or a complex processing machine. The gear machining device 1 mainly includes a bed 10, a column 20, a saddle 30, a rotary main spindle 40, a table 50, a tilt table 60, a turntable 70, a tool changer 150, and a control device 100.

The bed 10 is disposed on a floor. The column 20 is disposed on an upper surface of the bed 10. A pair of X-axis guide rails 11a and 11b extending in an X-axis direction (horizontal direction) is provided on the upper surface of the bed 10, and the column 20 is provided so as to be movable in the X-axis direction along the X-axis guide rails 11a and 11b. A ball screw-type feeding device (not depicted) configured to drive the column 20 in the X-axis direction is provided between the pair of X-axis guide rails 11a and 11b.

The saddle 30 is disposed on a side surface of the column 20. A pair of Y-axis guide rails 21a and 21b extending in a Y-axis direction (vertical direction) is provided on the side surface of the column 20, and the saddle 30 is provided so as to be movable in the Y-axis direction along the Y-axis guide rails 21a and 21b. A ball screw-type feeding device (not depicted) configured to drive the saddle 30 in the Y-axis direction is provided between the pair of Y-axis guide rails 21a and 21b.

The rotary main spindle 40 is driven to be rotated by a main spindle motor (not depicted) accommodated inside the saddle 30. To the distal end of the rotary main spindle 40, a tool used to machine a workpiece W is detachably fixed. The tool fixed to the rotary main spindle 40 moves in the X-axis direction and the Y-axis direction with respect to the bed 10 in accordance with movement of the column 20 and the saddle 30.

On an upper surface of the bed 10, the table 50 is disposed at a position that faces the column 20 and the saddle 30 in the Z-axis direction (horizontal direction). A pair of Z-axis guide rails 12a and 12b extending in the Z-axis direction is provided on the upper surface of the bed 10, and the table 50 is provided so as to be movable in the Z-axis direction along the Z-axis guide rails 12a and 12b. A ball screw-type feeding device (not depicted) configured to drive the table 50 in the Z-axis direction is provided between the pair of Z-axis guide rails 12a and 12b.

The tilt table 60 is disposed on an upper surface of the table 50. A pair of tilt-table support portions 51 that face each other in the X-axis direction is provided on the upper surface of the table 50, and the tilt table 60 is supported by the pair of the tilt-table support portions 51 so as to be swingable about the A-axis extending parallel to the X-axis direction. The tilt table 60 is driven to be swung by an A-axis motor (not depicted) accommodated inside the table 50.

The turntable 70 holds a workpiece W, and is provided so as to be rotatable about the C-axis extending orthogonal to the A-axis with respect to the tilt table 60. A C-axis motor (not depicted) is provided on a bottom surface of the tilt table 60, and the turntable 70 is driven to be rotated by the C-axis motor. The tool changer 150 automatically replaces the tool attached to the rotary main spindle 40 with a tool accommodated in a tool magazine (not depicted).

The control device 100 controls the main spindle motor to control the rotation speed of a tool, and also controls the C-axis motor to control the rotation speed of the workpiece W held on the turntable 70. Furthermore, the control device 100 controls various motors provided to the gear machining device 1 to control, for example, the angle of the rotation axis of the tool with respect to the rotation axis of the workpiece W and the feeding speed of the tool with respect to the workpiece W.

The control device 100 includes a roughing controller 110, a finishing controller 120, and a tool changing controller 130. The roughing controller 110 controls operation of the tool in roughing the workpiece W. The finishing controller 120 controls operation of the tool in finishing the workpiece W. The tool changing controller 130 controls operations of the tool changer 150 and the tool magazine (not depicted) in changing tools to be attached to the rotary main spindle 40.

Figure 2A:
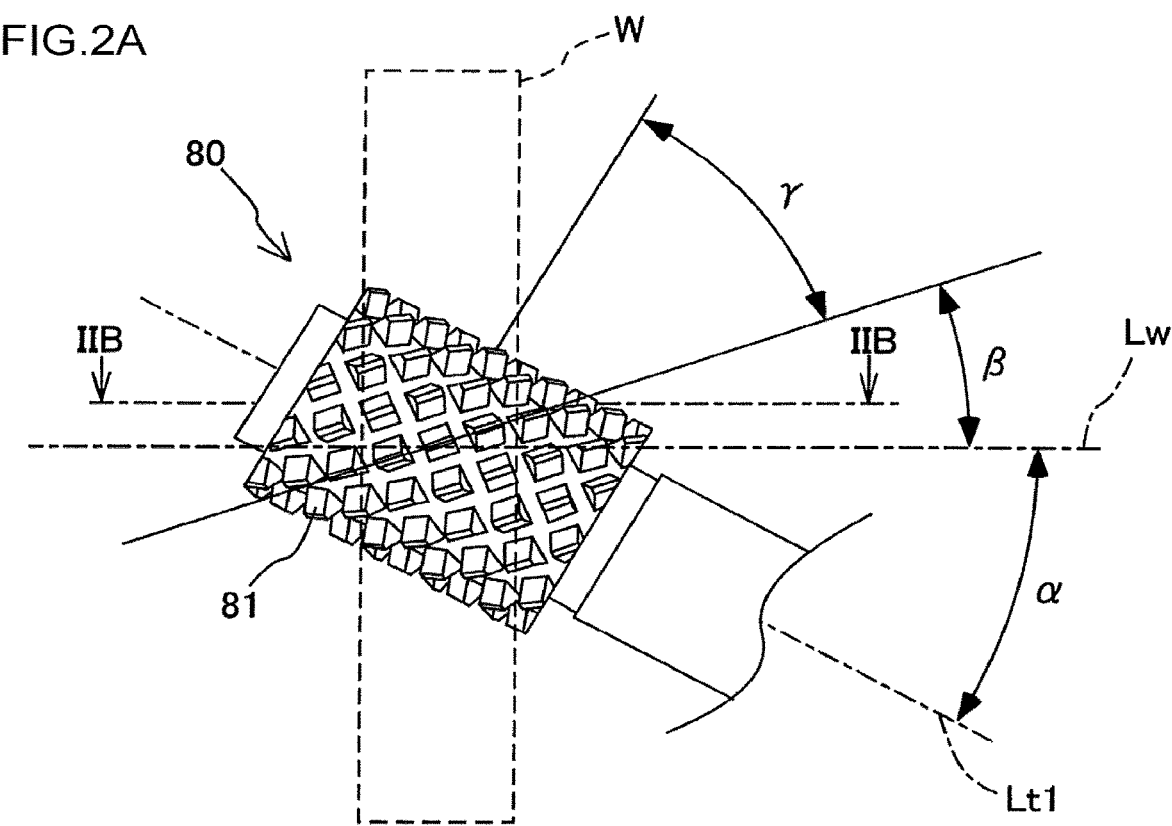
FIG. 2A is a side view of a hob cutter, illustrating a state in which a rotation axis of the hob cutter is inclined with respect to a rotation axis of a workpiece.

The following describes a tool to be fixed to the rotary main spindle 40. As depicted in FIG. 2A to FIG. 3, the gear machining device 1 performs gear machining with a hob cutter 80 or a skiving cutter 90 fixed to the rotary main spindle 40. In FIG. 2A and FIG. 3, in order for the drawings to be easily understood, the outline of the workpiece W is indicated by a dashed line and illustration other than the outline is omitted.

Figure 2B:
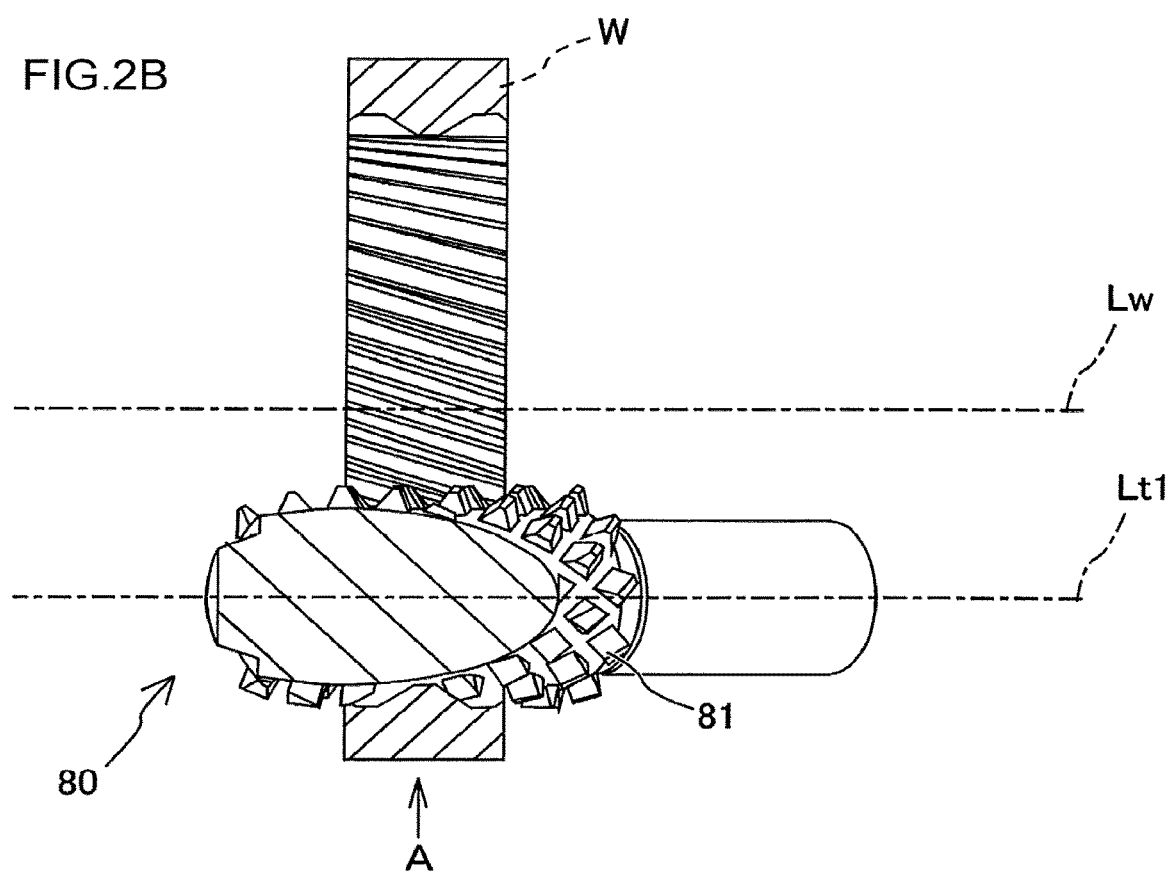
FIG. 2B is an enlarged sectional view of the hob cutter taken along line in FIG. 2A.
Figure 3:
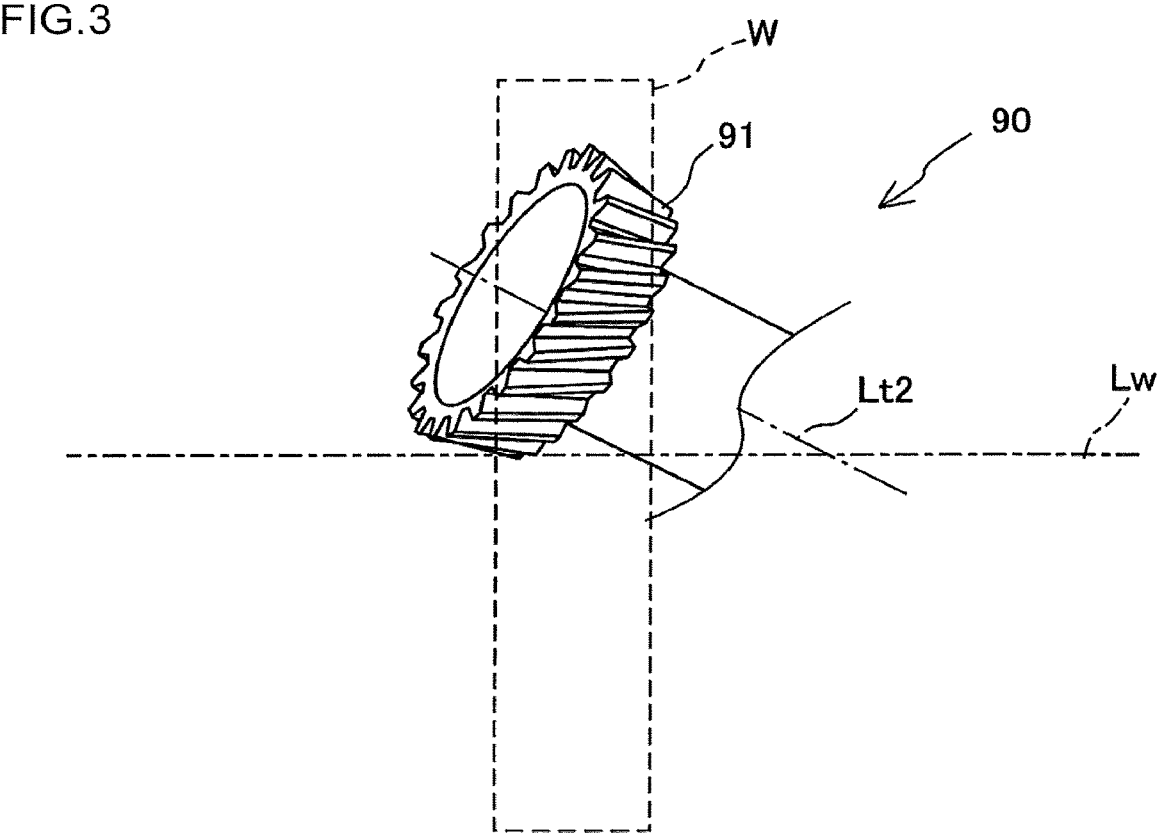
FIG. 3 is a side view of a skiving cutter, illustrating a state in which a rotation axis of the skiving cutter is inclined with respect to the rotation axis of the workpiece.

As depicted in FIG. 2A and FIG. 2B, the hob cutter 80 is a cylindrical tool, and a plurality of hob blades 81 are formed in a protruding manner on an outer peripheral surface of the hob cutter 80. The hob blades 81 are formed of ridges extending along helices that are crossed over by grooves inclined with respect to a rotation axis Lt1 of the hob cutter 80.

FIG. 2A and FIG. 2B illustrate, as one example of the hob cutter 80 used in the present embodiment, a hob cutter 80 having multi-thread hob blades 81 the helical direction of which is left-handed. FIG. 2A illustrates the hob cutter 80 when viewed from the direction of the arrow A indicated in FIG. 2B. Hereinafter, an inclination angle (rotation angle) of the rotation axis Lt1 of the hob cutter 80 is defined as a setting angle when the hob cutter 80 is rotated in one direction (clockwise in FIG. 2A) by a predetermined angle from a state in which the rotation axis Lt1 of the hob cutter 80 is arranged parallel to a rotation axis Lw of the workpiece W. A helical angle of a helical gear to be formed on the workpiece W with respect to the rotation axis Lw is defined as a helix angle, and a helical angle of the hob blades 81 formed on the hob cutter 80 with respect to the rotation axis Lt1 is defined as a thread angle.

As depicted in FIG. 3, the skiving cutter 90 has a plurality of skiving blades 91 that are helical with respect to the rotation axis Lt2. Radially outer surfaces of the skiving blades 91 each have a clearance angle with respect to the rotation axis Lt2 of the skiving cutter 90, and end surfaces of the skiving blades 91 each have a rake angle with respect to a plane orthogonal to the rotation axis Lt2 of the skiving cutter 90.

Figure 4A:
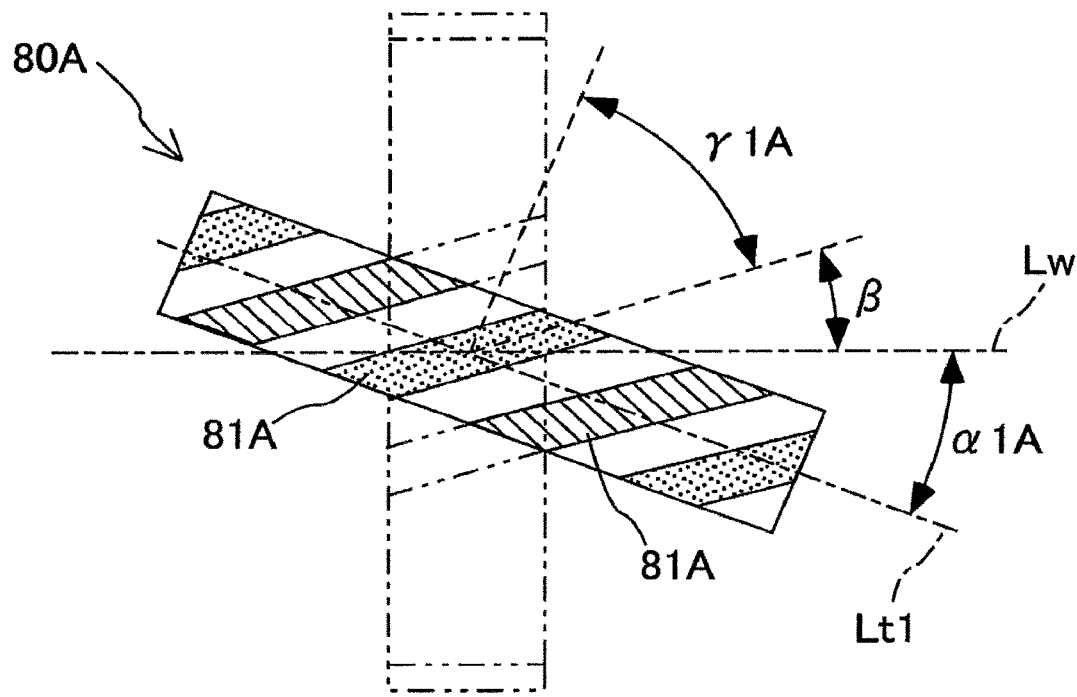
FIG. 4A is a diagram illustrating the gear machining method using a hob cutter having double-thread hob blades, illustrating a state when internal teeth are formed on a workpiece.
Figure 4B:
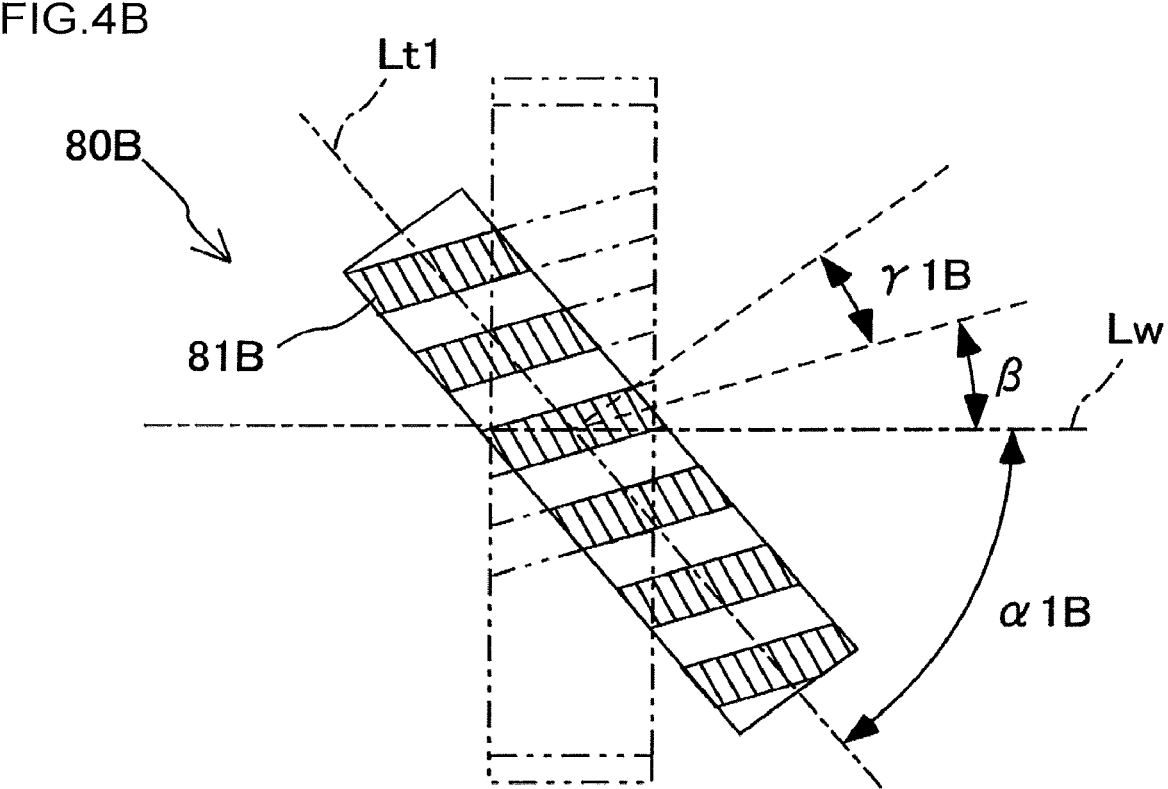
FIG. 4B is a diagram of the gear machining method using a hob cutter having single-thread hob blades, illustrating a state when internal teeth are formed on a workpiece.

The following describes relations between a gear to be formed on the workpiece W and hob cutters 80A and 80B with reference to FIG. 4A and FIG. 4B. Herein, an internal gear that is a helical gear is formed on the workpiece W as an example. It is assumed herein that the helical direction of the helical gear to be formed on the workpiece W is left-handed, and the helix angle thereof is denoted by β. In order for the drawings to be easily understood, FIG. 4A and FIG. 4B schematically illustrate a cross section of the workpiece W and some of internal teeth formed on the workpiece W.

As one example of the hob cutter 80 used in the present embodiment, FIG. 4A schematically illustrates a hob cutter 80A having double-thread hob blades 81A. The thread angle of the hob blades 81A formed on the hob cutter 80A is γ1A, and the helical direction of the hob blades 81A is left-handed in the same manner as that of the helical gear to be formed on the workpiece W. The setting angle of the hob cutter 80A is denoted by α1A. In this case, the sum of the setting angle α1A, the helix angle β, and the thread angle γ1A is 90 degrees, and thus the setting angle α1A is determined based on the thread angle γ1A.

As another example of the hob cutter 80 used in the present embodiment, FIG. 4B illustrates a hob cutter 80B having single-thread hob blades 81B. The thread angle of the hob blades 81B formed on the hob cutter 80B is γ1B, and the helical direction of the hob blades 81B is left-handed in the same manner as that of the helical gear to be formed on the workpiece W and the hob blades 81A formed on the hob cutter 80A. The hob blades 81A formed on the hob cutter 80A and the hob blades 81B formed on the hob cutter 80B have the same pitch. The setting angle of the hob cutter 80B is denoted by α1B. In this case, the sum of the setting angle α1B, the helix angle β, and the thread angle γ1B is 90 degrees, and thus the setting angle α1B is determined based on the thread angle γ1B.

As depicted in FIG. 4A and FIG. 4B, the thread angle γ1A of the hob blades 81A formed on the hob cutter 80A is larger than the thread angle γ1B of the hob blades 81B formed on the hob cutter 80B. In other words, if the hob cutters 80 have the same pitch, the thread angle increases as the number of threads of the hob blades 81 increases. When the helical direction of the helical gear to be formed on the workpiece W and the helical direction of the hob blades 81 formed on each hob cutter 80 are the same and the corresponding setting angle is a positive value, the setting angle decreases as the thread angle of the hob blades 81 increases.

Herein, when internal teeth are to be formed on a workpiece W with a hob cutter 80, the gear machining device 1 cannot insert the hob cutter 80 into the inside of the workpiece W if the setting angle is close to 90 degrees. When gear machining is performed on a workpiece W while a hob cutter 80 is being fed, even if machining with one hob blade 81 is performed, another hob blade 81 other than the one hob blade 81 (e.g., a hob blade 81 adjacent to the one hob blade 81) comes into contact with an inner peripheral surface of the workpiece W, whereby the workpiece W is machined by the other hob blade 81. The hob cutter 80 has a cylindrical shape and the shape of the other hob blade 81 is different from a shape transferred from a desired gear shape to be formed on the workpiece W. Thus, the desired gear shape cannot be formed even if gear machining with the hob cutter 80 is performed at a suitable setting angle. Consequently, when internal teeth are to be formed on a workpiece W, finishing cannot be performed with a hob cutter 80.

In view of this, when an internal gear is to be formed on a workpiece W in the gear machining method of the present embodiment, the workpiece W is machined by roughing with a hob cutter 80 (roughing step), and then is finished with a skiving cutter 90 (finishing step). This step enables the gear machining device 1 to form internal teeth in a desired gear shape.

Specifically, as a roughing step, the roughing controller 110 performs control to relatively feed the hob cutter 80 in the rotation axis Lw direction of the workpiece W while causing the hob cutter 80 to rotate in synchronization with the rotation of the workpiece W. At this time, the gear machining device 1 performs roughing while securing a cutting allowance such that part other than a cutting allowance is prevented from being machined.

Subsequently, as a finishing step, the finishing controller 120 performs control to relatively feed the skiving cutter 90 in the rotation axis Lw direction of the workpiece W while causing the skiving cutter to rotate in synchronization with the rotation of the workpiece W. At this time, using the skiving cutter 90, the gear machining device 1 performs finishing by cutting off the cutting allowance remaining on the workpiece W to form internal teeth in a desired gear shape. The tool changing controller 130 controls the tool changer 150 to change tools to be attached to the rotary main spindle 40.

When a workpiece W is machined with the skiving cutter 90, setting a larger depth of cut by skiving blades 91 causes the skiving blades 91 to wear sooner. The depth of cut is thus preferably set small when gear machining is performed with the skiving cutter 90. In this regard, machining with the hob cutter 80 at the roughing step can achieve a larger depth of cut while suppressing wear of the tool than machining with the skiving cutter 90, and thus can reduce time required for the roughing.

When the depth of cut is small, gear machining with the skiving cutter 90 enables improvement of machining accuracy and reduction of time required for the machining more effectively than gear machining with the hob cutter 80. In this regard, since roughing is performed in the gear machining method of the present embodiment, the cutting allowance that needs to be cut off at the finishing step can be set smaller. In other words, the finishing step enables machining at a smaller depth of cut than the roughing step. Thus, the gear machining method of the present embodiment uses the skiving cutter 90 at the finishing step, thereby enabling highly accurate machining while reducing time required for the finishing step.

In the gear machining method of the present embodiment, the finishing is performed after completion of the roughing step, and thus highly accurate machining is not necessary at the roughing step. Consequently, in the gear machining method of the present embodiment, the feeding speed can be set high, and thus time required for the roughing step can be reduced.

Furthermore, if the same pitch is used between a hob cutter 80 having multi-thread hob blades 81 and a hob cutter 80 having single-thread hob blades 81, the hob cutter 80 having multi-thread hob blades 81 enables further reduction of time required for roughing than the hob cutter 80 having single-thread hob blades 81.

Thus, in comparison between the hob cutter 80A depicted in FIG. 4A and the hob cutter 80B depicted in FIG. 4B, the hob cutter 80A having the double-thread hob blades 81A enables further reduction of time required for roughing than the hob cutter 80B having the single-thread hob blades 81B. Furthermore, as described above, the setting angle α1A of the hob cutter 80A is smaller than the setting angle α1B of the hob cutter 80B, and thus the degree of contact can be reduced between a workpiece W and a portion of the hob cutter 80 with which machining is not intended to be performed. In this case, the gear machining device 1 can prevent a portion other than a cutting allowance of the workpiece W from being cut by hob blades 81 of the hob cutter 80 with which machining is not intended to be performed and that come into contact with the workpiece W at the roughing step. The gear machining device 1 also enables reduction of a cutting allowance that remains after completion of the roughing step. Consequently, the gear machining device 1 allows the depth of cut by the skiving cutter 90 to be set smaller at the finishing step, and thus enables reduction of time required for the finishing while suppressing wear of the skiving cutter 90.

If the same pitch is used between the hob cutter 80 having multi-thread hob blades 81 and the hob cutter 80 having single-thread hob blades 81, the hob cutter 80 having multi-thread hob blades 81 has a smaller number of hob blades 81 formed in each thread than the hob cutter 80 having single-thread hob blades 81. Thus, the hob cutter 80 having multi-thread hob blades 81 provides lower machining accuracy of internal teeth formed on a workpiece W than the hob cutter 80 having single-thread hob blades 81. However, in the present embodiment, because finishing with a skiving cutter 90 is performed after completion of roughing with a hob cutter 80, the gear machining device 1 can forms a highly accurate gear even when performing the roughing with the hob cutter 80 having multi-thread hob blades 81.

Thus, the hob cutter 80A having the multi-thread hob blades 81A enables reduction of time required for gear machining and improvement of machining accuracy more effectively than the hob cutter 80B having the single-thread hob blades 81B. In this case, the gear machining device 1 can achieve lower tool costs by using the cylindrical hob cutter 80 to perform the roughing. The hob cutter 80A can achieve higher machining efficiency than the hob cutter 80B, and thus can increase tool life.

Even when using the hob cutter 80B having the single-thread hob blades 81B to perform roughing, the gear machining device 1 enables improvement of machining accuracy and reduction of time required for gear machining more effectively by finishing with the skiving cutter 90 than when using only the hob cutter 80 or only the skiving cutter 90 to perform the gear machining.

The following describes a modification in which internal teeth are formed on a workpiece W. In the embodiment above, the helical direction of hob blades 81 formed on a hob cutter 80 is the same as the helical direction of a helical gear to be formed on a workpiece W, but the present invention is not limited to this. Specifically, the helical direction of the hob blades 81 formed on the hob cutter 80 may be opposite to the helical direction of the helical gear to be formed on the workpiece W.

In this case, when the same pitch is used and the setting angle is set to a positive value, the setting angle decreases as the thread angle of the hob blades 81 decreases. In other words, the setting angle can be set smaller for a hob cutter 80 having single-thread hob blades 81 than for a hob cutter 80 having multi-thread hob blades 81.

The following describes a second embodiment. In the first embodiment, at the roughing step, a workpiece W is machined while a hob cutter 80 is being fed. By contrast, in the second embodiment, at a roughing step, the workpiece W is machined while the axial position of a hob cutter 80 with respect to a workpiece W is being maintained. Herein, the same components as those described above in the first embodiment are designated by the same numerals, and description thereof is omitted.

Figure 5A:
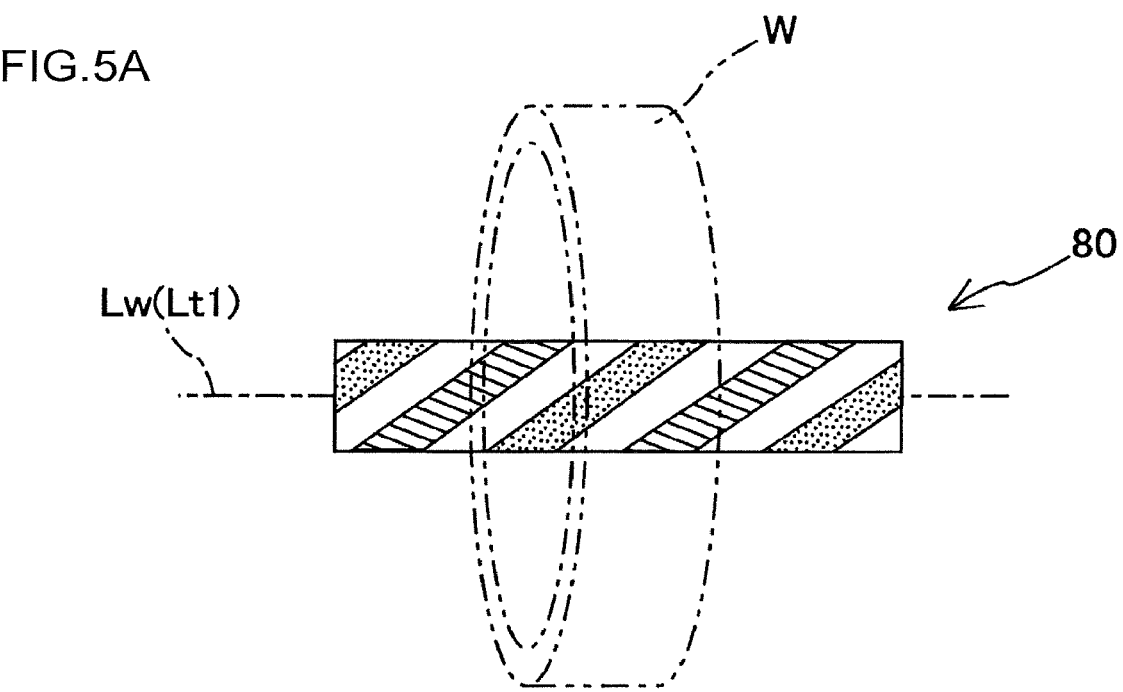
FIG. 5A is a diagram illustrating a gear machining method according to a second embodiment, illustrating a process of setting a hob cutter.
Figure 5B:
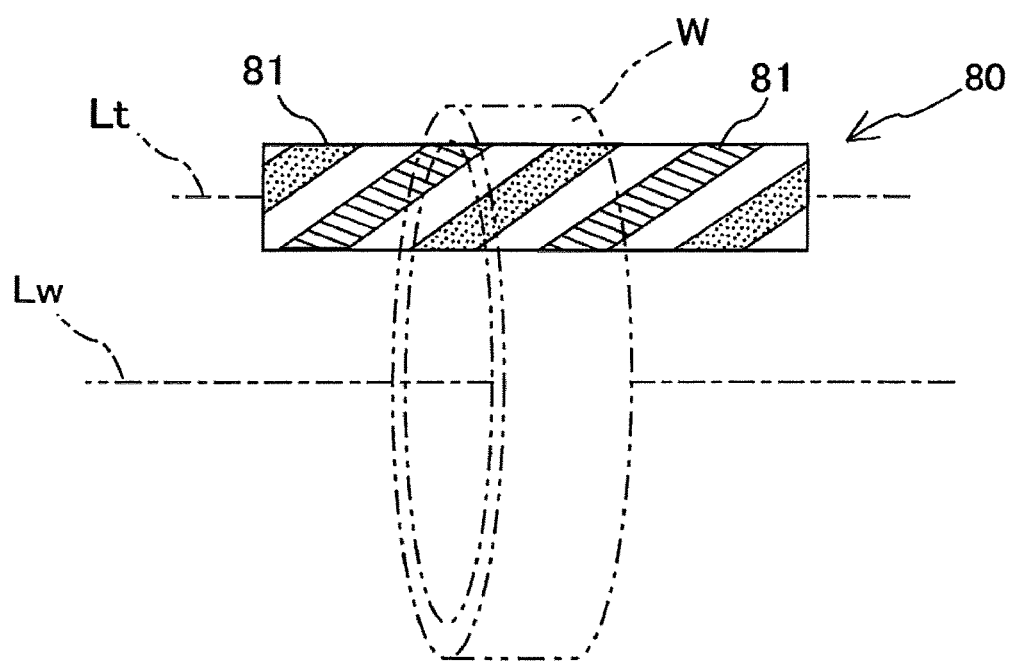
FIG. 5B is a diagram illustrating the gear machining method, illustrating a state in which the hob cutter has been set.

As depicted in FIG. 5A and FIG. 5B, in a gear machining method according to the second embodiment, at the roughing step using the hob cutter 80, the gear machining device 1 first disposes the hob cutter 80 such that a setting angle matches the helix angle of a helical gear to be formed on the workpiece W and the thread angle of the hob cutter 80. Subsequently, the gear machining device 1 moves the hob cutter 80 in the radial direction to dispose the hob cutter 80 at a position that enables machining of the workpiece W. The gear machining device 1 machines an inner peripheral surface of the workpiece W while maintaining the position of the hob cutter 80 in the rotation axis Lt1 direction with respect to the workpiece W. After the roughing step is completed, the gear machining device 1 performs finishing by cutting off, with a skiving cutter 90, a cutting allowance remaining on the workpiece W so as to form a desired gear shape.

In the gear machining method of the present embodiment, gear machining is performed with the hob cutter 80, thereby reducing time required for the roughing step. At the finishing step in the gear machining method of the present embodiment, the cutting allowance remaining after machining is cut off with the skiving cutter 90, thereby forming internal teeth in a desired gear shape on the workpiece W.

The following describes a third embodiment. In the first embodiment, an internal gear is formed on a workpiece W. In the third embodiment, an external gear is formed on a workpiece W, and an incomplete tooth portion 283 connecting together an external tooth 281 and a portion on which an external tooth is not formed is formed on the workpiece. Herein, the same components as those described above in the respective embodiments are designated by the same numerals, and description thereof is omitted.

Figure 6:
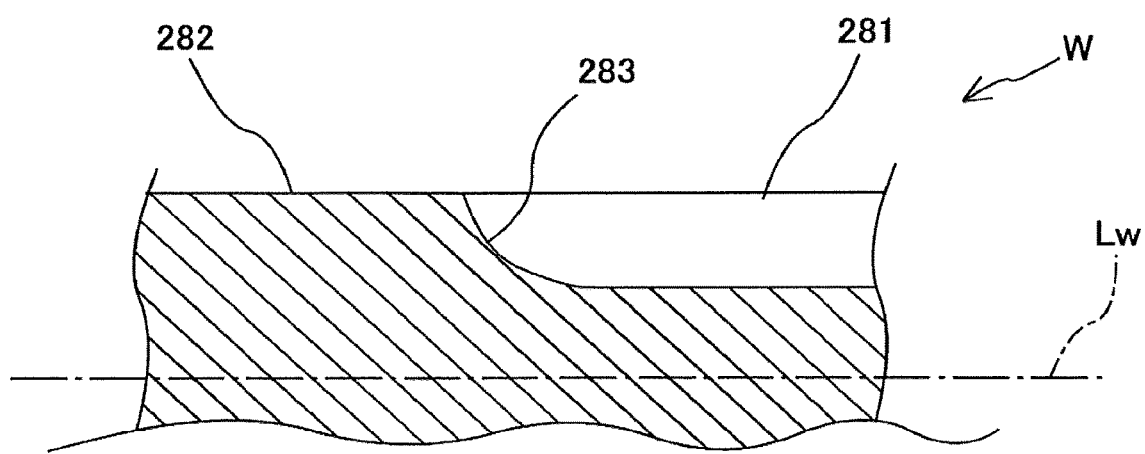
FIG. 6 is an enlarged diagram of part of an external gear formed by a gear machining method according to a third embodiment, illustrating in an enlarged manner a part where an external-tooth unformed portion is formed.

The incomplete tooth portion 283 will be described first. As depicted in FIG. 6, the incomplete tooth portion 283 is formed on the workpiece W. The incomplete tooth portion 283 connects together the external tooth 281 and an external-tooth unformed portion 282 that is an outer peripheral surface on which an external tooth is not formed. The incomplete tooth portion 283 is a steeply cut portion that is formed between the external tooth 281 and the external-tooth unformed portion 282 when the external tooth 281 is formed with a hob cutter 80. The external-tooth unformed portion 282 is a portion that does not serve as an external tooth, and the axial length of the external gear to be formed on the workpiece W increases as the axial length of the external-tooth unformed portion 282 increases. Thus, from a viewpoint of downsizing the external gear to be formed on the workpiece W, the axial length of the external-tooth unformed portion 282 is preferably short.

The axial length of the external-tooth unformed portion 282 decreases as the setting angle becomes closer to 90 degrees. In other words, when an external gear is formed on a workpiece W and an external-tooth unformed portion 282 is also formed thereon, the thread angle of a hob cutter 80 is preferably set such that the setting angle thereof is close to 90 degrees.

Figure 7A:
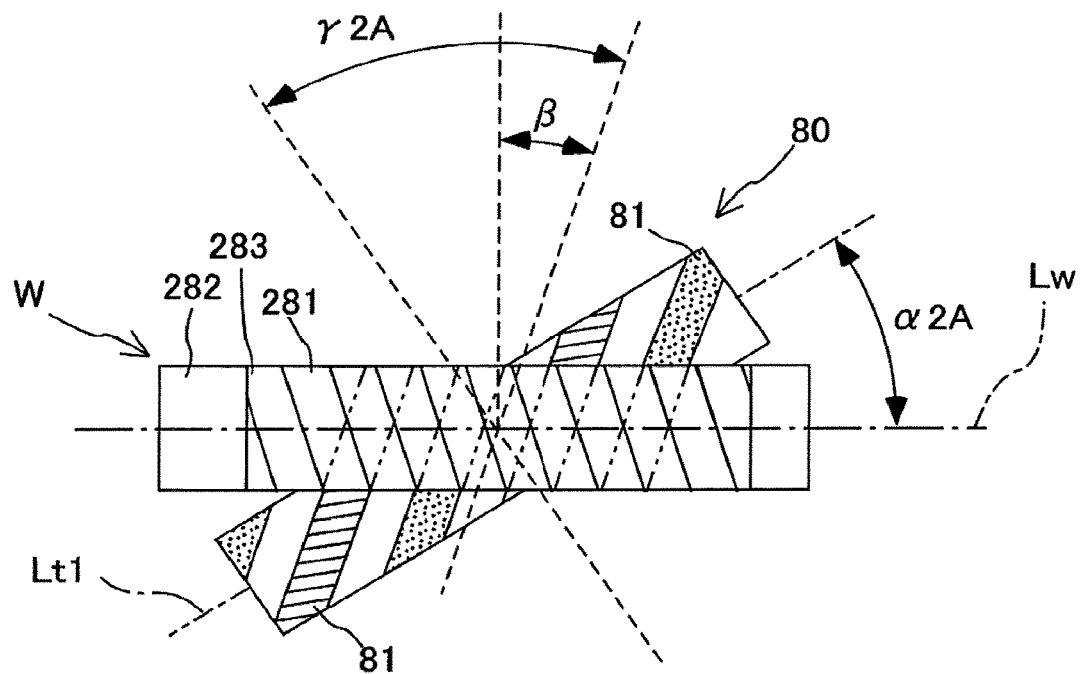
FIG. 7A is a diagram illustrating the gear machining method using the hob cutter having the double-thread hob blades, illustrating a state when external teeth is formed on a workpiece.
Figure 7B:
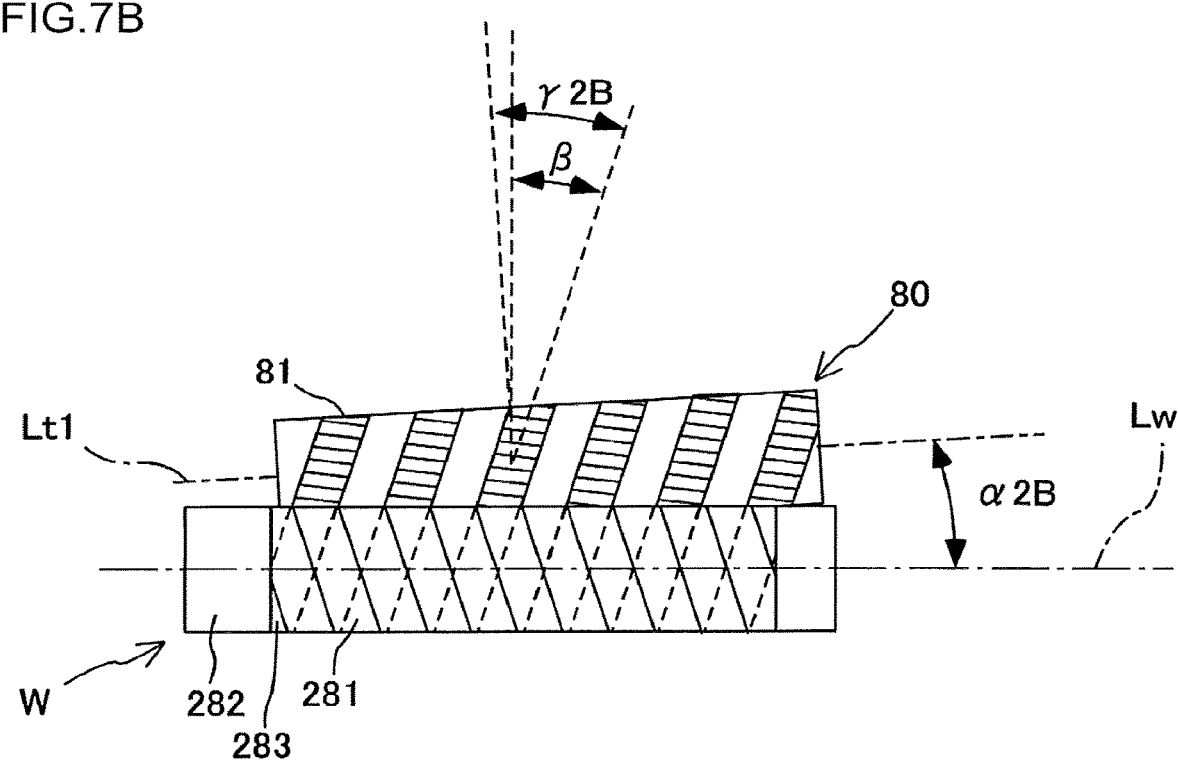
FIG. 7B is a diagram illustrating the gear machining method using the hob cutter having the single-thread hob blades, illustrating a state when external teeth is formed on a workpiece.

The following describes a relation between an external gear to be formed on a workpiece W and a hob cutter 80 with reference to FIG. 7A and FIG. 7B. Herein, an example is described in which an external gear that is a helical gear is formed on the workpiece W. It is assumed that the helical direction of the helical gear to be formed on the workpiece W is left-handed, and the helix angle is denoted by $\beta$.

FIG. 7A and FIG. 7B illustrate states in which hob cutters 80A and 80B are positioned on the far side of the page with respect to the workpiece W. In the outer peripheral surface of the workpiece W, gear machining is performed on a surface facing the far side of the page. In FIG. 7A and FIG. 7B, the dashed lines drawn on the outer peripheral surface of the workpiece W schematically indicate the shape of external teeth formed on the far side of the page.

FIG. 7A illustrates a state in which external teeth is formed on the workpiece W with the hob cutter 80A having double-thread hob blades 81A, and the setting angle of the hob cutter 80A is denoted by $\alpha 2A$. FIG. 7B illustrates a state in which external teeth is formed on the workpiece W with the hob cutter 80B having single-thread hob blades 81B, and the setting angle of the hob cutter 80B is denoted by $\alpha 2B$.

As depicted in FIG. 7A and FIG. 7B, each setting angle is a positive value equal to or smaller than 90 degrees, which corresponds to the difference of the helix angle subtracted from the thread angle. Thus, when an external gear is formed on the workpiece W, if the helical direction of a helical gear to be formed on the workpiece W and the helical direction of the hob cutter 80 are the same, the setting angle increases as the thread angle increases.

Thus, in comparison between a hob cutter 80 having double-thread hob blades 81 and a hob cutter 80 having single-thread hob blades 81, the axial length of the external-tooth unformed portion 282 formed on the workpiece W can be made shorter in gear machining with the hob cutter 80 having double-thread hob blades 81 than in gear machining with the hob cutter 80 having single-thread hob blades 81. The hob cutter 80 having double-thread hob blades 81 enables further reduction of time required for the roughing step than the hob cutter 80 having single-thread hob blades 81.

Even if the hob cutter 80B having the single-thread hob blades 81B is used for roughing, the gear machining device 1 performs finishing with the skiving cutter 90. This enables improvement of machining accuracy and reduction of time required for gear machining more effectively than when only the hob cutter 80 or the skiving cutter 90 is used for the gear machining.

The following describes modifications when external teeth is formed on a workpiece W. In the third embodiment described above, the helical direction of hob blades 81 formed on a hob cutter 80 is the same as the helical direction of a helical gear to be formed on a workpiece W. However, the present invention is not limited to this. Specifically, the helical direction of the hob blades 81 formed on the hob cutter 80 may be opposite to the helical direction of the helical gear to be formed on the workpiece W.

In this case, when the same pitch is used and the setting angle is set to a positive value, the setting angle increases as the thread angle of the hob blades 81 decreases. In other words, the setting angle can be set larger for a hob cutter 80 having single-thread hob blades 81 than for a hob cutter 80 having multi-thread hob blades 81.

The embodiments above describes cases in which the present invention is applied when a helical gear is formed on a workpiece W. However, the present invention may be applied when a spur gear is formed thereon.

In the embodiments above, examples have been described in which the hob cutter 80A having the double-thread hob blades 81A is used as a hob cutter 80 having multi-thread hob blades 81. Needless to say, however, a hob cutter 80 having hob blades 81 with three or more threads may also be used. The thread angle of the hob cutter 80 increases as the number of threads of the hob blades 81 increases, and thus by appropriately adjusting the number of threads of the hob blades 81, the gear machining device 1 can set an appropriate setting angle in gear machining.

Furthermore, the gear machining device 1 alone can perform various types of machining such as turning, hobbing, shaping, skiving, chamfering, and drilling by changing tools with the tool changer 150.

As described above, the gear machining method includes a roughing step and a finishing step. The roughing step involves roughing a workpiece W while causing a cylindrical hob cutter 80 to rotate in synchronization with a rotation of the workpiece W such that a cutting allowance remains. The finishing step involves cutting the cutting allowance remaining on the workpiece W on which the roughing has been performed at the roughing step to form a desired gear shape by feeding a skiving cutter 90 relatively to the workpiece W in the rotation axis Lw direction of the workpiece W while causing the skiving cutter 90 to rotate in synchronization with the rotation of the workpiece W.

The gear machining method does not require highly accurate machining at the roughing step, and thus the feeding speed of the hob cutter 80 can be set high. In the gear machining method, finishing is performed with the skiving cutter 90 on the workpiece W on which roughing has been performed, whereby a gear to be formed on the workpiece W can be formed in a desired shape.

When a cutting allowance in machining of a workpiece W is large, machining with a hob cutter 80 can achieve a larger depth of cut while suppressing wear of a tool than machining with the skiving cutter 90. When the cutting allowance in machining of the workpiece W is small, machining with the skiving cutter 90 can achieve faster and more accurate machining than machining with the hob cutter 80. Thus, the gear machining method enables reduction of time required for gear machining through roughing with the hob cutter 80 and finishing with the skiving cutter 90.

In the gear machining device described above, the gear machining method involves forming an internal gear that is a helical gear on the workpiece W. The hob cutter 80 has multi-thread hob blades 81 that have a helix angle with respect to a plane orthogonal to the rotation axis Lt1 of the hob cutter 80, and the helical direction of the hob blades 81 is the same as the helical direction of the helical gear to be formed on the workpiece W.

In the gear machining method, when the helical direction of the hob blades 81 is the same as the helical direction of the internal gear that is the helical gear to be formed on the workpiece W, the gear machining device 1 uses the hob cutter 80 having the multi-thread hob blades 81 at the roughing step. In this case, in the gear machining device 1, the inclination angle (setting angle) of the rotation axis Lt1 of the hob cutter 80 with respect to the rotation axis Lw of the workpiece W can be set smaller than that when a hob cutter 80 having single-thread hob blades 81 is used. In this case, when a workpiece W is to be machined with one hob blade 81, the degree of contact can be reduced between the workpiece W and another hob blade 81 other than the one hob blade 81. Consequently, in the gear machining method of the present invention, a cutting allowance that remains after completion of the roughing step can be reduced. This suppresses wear of the skiving cutter 90 and reduces time required for finishing.

In the gear machining method, gear machining is performed with the hob cutter 80 having the multi-thread hob blades 81, whereby time required for the roughing step can be further reduced than when gear machining is performed with a hob cutter 80 having single-thread hob blades 81.

The gear machining method described above is a method of forming an internal gear that is a helical gear on the workpiece W. The hob cutter 80 has single-thread hob blades 81 that have a helix angle with respect to a plane orthogonal to the rotation axis Lt1 of the hob cutter 80, and the helical direction of the hob blades 81 is opposite to the helical direction of the helical gear to be formed on the workpiece W.

In the gear machining method, when the helical direction of the hob blades 81 is opposite to the helical direction of the internal gear that is the helical gear to be formed on the workpiece W, the gear machining device 1 uses the hob cutter 80 having the single-thread hob blades 81 at the roughing step. In this case, in the gear machining device 1, the inclination angle (setting angle) of the rotation axis Lt1 of the hob cutter 80 with respect to the rotation axis Lw of the workpiece W can be set smaller than that when a hob cutter 80 having multi-thread hob blades 81 is used. In this case, when a workpiece W is to be machined with one hob blade 81, the degree of contact can be reduced between the workpiece W and another hob blade 81 other than the one hob blade 81. Consequently, in the gear machining method of the present invention, a cutting allowance that remains after completion of the roughing step can be reduced, and thus wear of the skiving cutter can be suppressed and also time required for finishing can be reduced.

The gear machining method described above is a method of forming, on the workpiece W, an incomplete tooth portion 283 connecting together an external gear that is a helical gear and a portion on which the helical gear is not formed. The hob cutter 80 has multi-thread hob blades 81 that have a helix angle with respect to a plane orthogonal to the rotation axis Lt1 of the hob cutter 80, and the helical direction of the hob blades 81 is the same as the helical direction of the helical gear to be formed on the workpiece W.

In the gear machining method, when the helical direction of the hob blades 81 is the same as the helical direction of the external gear that is the helical gear to be formed on the workpiece W, the gear machining device 1 uses the hob cutter 80 having the multi-thread hob blades 81 at the roughing step. This can reduce the axial length of the incomplete tooth portion 283 formed on the workpiece W than that when the hob cutter 80 having single-thread hob blades 81 is used.

In the gear machining method, gear machining with the hob cutter 80 having the multi-thread hob blades 81 can further reduce time required for the roughing step than when gear machining is performed with a hob cutter 80 having single-thread hob blades 81.

The gear machining method described above is a method of forming, on the workpiece W, an incomplete tooth portion 283 connecting together an external gear that is a helical gear and a portion on which the helical gear is not formed. The hob cutter 80 has single-thread hob blades 81 that have a helix angle with respect to a plane orthogonal to the rotation axis Lt1 of the hob cutter 80, and the helical direction of the hob blades 81 is opposite to the helical direction of the helical gear to be formed on the workpiece W.

In the gear machining method, when the helical direction of the hob blades 81 is opposite to the helical direction of the internal gear that is the helical gear to be formed on the workpiece W, the gear machining device 1 uses the hob cutter 80 having single-thread hob blades 81 at the roughing step. In this case, in the gear machining device 1, the axial distance of the incomplete tooth portion 283 formed on the workpiece W can be made shorter than that when a hob cutter 80 having multi-thread hob blades 81 is used.

The gear machining device according to one embodiment of the present invention includes the roughing controller 110 and the finishing controller 120. The roughing controller 110 controls roughing on a workpiece W while causing a cylindrical hob cutter 80 to rotate in synchronization with a rotation of the workpiece W such that a cutting allowance remains. The finishing controller 120 controls finishing of cutting the cutting allowance remaining on the workpiece W on which the roughing has been performed to form a desired gear shape by feeding a skiving cutter 90 relatively to the workpiece W in the rotation axis Lw direction of the workpiece W while causing the skiving cutter 90 to rotate in synchronization with the rotation of the workpiece W.

According to the gear machining device 1, the roughing controller 110 does not require highly accurate machining at the roughing step, and thus the feeding speed of the hob cutter 80 can be set high. The finishing controller 120 performs finishing with the skiving cutter 90 on the workpiece W on which roughing has been performed, whereby a gear to be formed on the workpiece W can be formed in a desired shape.

Furthermore, the gear machining device 1 can achieve lower tool costs by using the cylindrical hob cutter 80 than when a barrel-shaped hob cutter is used. Thus, the gear machining device 1 enables both reduction of machining time and improvement of machining accuracy while suppressing increase of tool costs.

What is claimed is:

1. A gear machining method comprising:
   roughing a workpiece using a cylindrical hob cutter by causing the cylindrical hob cutter to rotate in synchronization with a rotation of the workpiece such that a cutting allowance remains; and
   finishing by cutting off the cutting allowance remaining on the workpiece on which the roughing has been performed during the roughing to form a desired gear shape, the finishing comprising feeding a skiving cutter relatively to the workpiece along a rotation axis direction of the workpiece while causing the skiving cutter to rotate in synchronization with the rotation of the workpiece.

2. The gear machining method according to claim 1 applied to form an internal helical gear on the workpiece, wherein: the hob cutter has multi-thread hob blades that have a helix angle with respect to a plane orthogonal to a rotation axis of the hob cutter, and
   a helical direction of the hob blades is the same as a helical direction of the helical gear to be formed on the workpiece.

3. The gear machining method according to claim 1 applied to form an internal helical gear on the workpiece, wherein: the hob cutter has a single-thread hob blade that has a helix angle with respect to a plane orthogonal to a rotation axis of the hob cutter, and
   a helical direction of the hob blade is opposite to a helical direction of the helical gear to be formed on the workpiece.

4. The gear machining method according to claim 1, applied to form, on the workpiece, an incomplete tooth portion connecting together an external helical gear and a portion on which the helical gear is not formed,
   the hob cutter has multi-thread hob blades that have a helix angle with respect to a plane orthogonal to a rotation axis of the hob cutter, and
   a helical direction of the hob blades is the same as a helical direction of the helical gear to be formed on the workpiece.

5. The gear machining method according to claim 1, applied to form, on the workpiece, an incomplete tooth portion connecting together an external helical gear and a portion on which the helical gear is not formed,
   the hob cutter has a single-thread hob blade that has a helix angle with respect to a plane orthogonal to a rotation axis of the hob cutter, and
   a helical direction of the hob blade is opposite to a helical direction of the helical gear to be formed on the workpiece.

6. A gear machining device comprising:
   a workpiece mounting portion for mounting a workpiece for rotation about a workpiece rotation axis;
   a cylindrical hob cutter mounted to rotate;
   a skiving cutter mounted to rotate and to be fed along a direction parallel to the workpiece rotation axis;
   a roughing controller that causes the cylindrical hob cutter to rotate in synchronization with rotation of the workpiece such that a cutting allowance remains, and
   a finishing controller that feeds the skiving cutter relatively to the workpiece in the workpiece rotation axis direction while causing the skiving cutter to rotate in synchronization with the rotation of the workpiece.

* * * * *